United States Patent [19]

Wöhrle et al.

[11] 4,291,895
[45] Sep. 29, 1981

[54] TORSION-BAR WHEEL SUPPORT FOR TRAILER

[75] Inventors: Rudolf Wöhrle, Ichenhausen; Robert Köhler, Kemnat, both of Fed. Rep. of Germany

[73] Assignee: Alois Kober KG, Kötz, Fed. Rep. of Germany

[21] Appl. No.: 96,224

[22] Filed: Nov. 20, 1979

[30] Foreign Application Priority Data

Nov. 30, 1978 [DE] Fed. Rep. of Germany ....... 2851829

[51] Int. Cl.³ ............................................. B60G 11/18
[52] U.S. Cl. .................................................. 280/723
[58] Field of Search ............... 280/721, 723, 722, 725, 280/700, 695, 126, 128; 267/57

[56] References Cited

U.S. PATENT DOCUMENTS

| | | | |
|---|---|---|---|
| 819,302 | 5/1906 | Munsing | 280/725 X |
| 1,889,939 | 12/1932 | Thomas | 280/725 X |
| 2,270,571 | 1/1942 | Woolson et al. | 280/723 X |
| 2,782,027 | 2/1957 | Bergquist et al. | 280/725 X |
| 3,183,018 | 5/1965 | Holmstrom | 280/723 X |
| 3,195,919 | 7/1965 | Lossman | 280/700 |
| 3,402,940 | 9/1968 | De Castelet | 280/723 |
| 3,615,081 | 10/1971 | Ravenel | 280/723 X |
| 4,106,789 | 8/1978 | High | 280/695 X |

FOREIGN PATENT DOCUMENTS 7319964 5/1973 Fed. Rep. of Germany .

Primary Examiner—Joseph F. Peters, Jr.
Assistant Examiner—Norman L. Stack, Jr.
Attorney, Agent, or Firm—Karl F. Ross

[57] ABSTRACT

An assembly for movably supporting a wheel on a frame of a house trailer has a torsion bar extending horizontally perpendicular to the normal horizontal transport direction of the trailer, with the inner bar end being anchored to the trailer frame and the outer bar end being limitedly elastically pivotal about the bar axis relative to the inner bar end. An arm extends generally perpendicular to the bar axis and generally in the transport direction, and has an inner arm end fixed to the outer bar end and an outer arm end. This arm is formed of a piece of flexible steel plate lying in a vertical plane parallel to the normal transport direction so as to be substantially inflexible angularly of the bar axis between the arm ends and relatively flexible parallel to the bar axis between the arm ends. A substantially rigid and inflexible wheel-support strut has an outer strut end connected to the outer arm end and an inner strut end mounted by means of a bearing on the frame for pivoting of the strut about a strut axis skew to the bar axis and passing through the inner strut end. The outer strut and outer arm ends carry a wheel that is rotatable about a wheel axis substantially parallel to the bar axis. As the strut pivots about the strut axis the bar will twist about the bar axis and the arm will deform parallel to the bar and wheel axes between the outer strut and bar ends.

10 Claims, 3 Drawing Figures

TORSION-BAR WHEEL SUPPORT FOR TRAILER

FIELD OF THE INVENTION

The present invention relates to an assembly for movably supporting a wheel on a vehicle frame. More particularly this invention concerns such an assembly used to support the nondriven road wheels of a house trailer or the like.

BACKGROUND OF THE INVENTION

The wheels of a house trailer rotate about wheel axes perpendicular to the normal direction of travel of the trailer. These wheels are normally mounted on struts themselves pivotal about axes that are skew, that is neither intersecting nor parallel, with reference to the wheel axes. Typically each strut pivot axis is inclined inwardly upwardly and outwardly backwardly relative to the motor vehicle and its normal horizontal forward direction of travel. Such pivoting about these skew axes gives excellent road-handling capabilities, providing the right camber and caster for best roadability, with best transmission force from the center of the load to the wheels.

German Utility Model No. 7 319 964 discloses such a system with a so-called elastomeric spring axle. This is formed of a prismatic-section support tube fixed in the frame of the vehicle and provided internally with a torsion bar coupled with a wheel-support arm. The torsion bar engages the support tube by means of elastomeric webs. In order to obtain the desired pivoting about a skew axis the support tube is bent and in each bent part has a respective torsion bar and is elastomerically supported.

Such an arrangement is relatively complex and expensive to make. It is relatively difficult to service in the event that any of its parts fail. Finally the elastomeric mounting is extremely disadvantageous in that in extremely cold climates the spring characteristics for the bodies responsible for the cushion mounting change. In fact the elastic limit of such bodies decreases greatly with decreasing temperature, so that when used under very cold conditions failure is a common problem.

OBJECTS OF THE INVENTION

It is therefore an object of the present invention to provide an improved assembly for movably supporting a wheel on a frame of a vehicle.

Another object is to provide such an assembly which supports a wheel for pivoting about a skew axis as described above.

Yet another object is to provide such an arrangement which is relatively temperature-insensitive, and which can be produced at relatively low cost.

Finally an object of this invention is to provide such an arrangement which can readily be adapted to different types of vehicles and loads, and which can be adjusted when installed to compensate for imbalanced side-to-side loading of the vehicle it is provided on.

SUMMARY OF THE INVENTION

These objects are attained according to the instant invention by providing a torsion bar which extends horizontally substantially perpendicular to the normal horizontal transport direction for the vehicle and which has an inner bar end anchored to the frame and an outer bar end limitedly elastically pivotal about a bar axis relative to the inner bar end. This bar axis extends horizontally and perpendicular to the normal direction of travel. A wheel-support arm extends generally perpendicular to the bar axis and generally in the direction of travel. This arm has an inner arm end fixed to the outer bar end and an outer arm end. The arm is substantially inflexible angularly of the axis between the arm ends and is relatively flexible parallel to the bar axis between its arm ends. A substantially rigid and inflexible wheel-support strut has an outer strut end connected to the outer arm end and an inner strut end supported in a bearing on the frame for pivoting of this strut about a strut axis skew to the bar axis and passing through the inner strut end. The motor-vehicle wheel is mounted on the outer strut and arm ends for rotation about a wheel axis substantially parallel to the bar axis. As the rigid strut pivots about the strut axis, the bar twists about the bar axis and the arm deforms between the outer strut and bar ends in a direction parallel to the bar and wheel axes.

Such an arrangement has the considerable advantage that the parts are all formed of metal, even those that must be deformed. The torsion bar is deformed torsionally between its bar ends, and the wheel-support arm is formed as a flexible metal plate lying in a plane perpendicular to the bar and wheel axes and generally parallel to the transport direction, so that although it is extremely stiff in its plane it can easily deform somewhat parallel to the wheel and bar axis. The system can be dimensioned to have a very gentle slope to the curve for its spring charcteristic, while nonetheless being equally stiff against deformation in both directions angularly of the bar axis. Such an arrangement is virtually insensitive to temperature, so that it has a very long service life. At the same time it can be produced at relatively low cost.

According to further features of this invention the torsion bar is of regular polygonal cross section. Such a formation makes it relatively easy to fix the inner and outer bar ends in the frame and in the wheel-support arm. It is also possible to use a group of polygonal-section rods to form the torsion bar. Using hexagonal shape for the cross section allows the rods to be grouped together laterally engaging each other to form a very compact torsion bar that nonetheless has a spring characteristic that can be readily established. Furthermore such an arrangement readily allows a shock absorber to be mounted with its one end on the vehicle frame and its other end on the outer arm and strut ends so that it has a long travel path and can, therefore, be dimensioned easily to handle even the heaviest loads.

A particular advantage of this system is that it allows the assembly to be modified for virtually any type of vehicle or size of load. In the event that the vehicle is relatively narrow, two such assemblies can share a common torsion bar which is merely anchored at the center of the vehicle. For longer vehicles separate torsion bars may be employed. What is more the torsion bar, which as described above may comprise a bundle of separate rods, can be easily decreased or increased in size to compensate even for extremely heavy, or very light, loads. The fabricator of house trailers can buy the torsion-bar rod stock in long pieces, and merely cut off that which is needed for a particular wheel assembly.

According to this invention the skew axis forms with the bar axis and seen from above an angle of between 14° and 18°, preferably 16°, inclined backwardly and inwardly relative to the vehicle travel direction. The axis also forms seen from behind an angle of between 4° and 8°, preferably 6°, inclined upwardly and inwardly relative to the vehicle and the horizontal. Such dimensions have been found extremely practical for most house trailers.

According to this invention the assembly includes a head mounted at the outer end of the torsion bar and fixed to the inner end of the wheel-support arm. This head has an extension of cylindrical shape centered on the bar axis and extending inwardly around the bar in a support tube also centered on the bar axis and forming a fixed part of the vehicle frame. This cylindrically tubular extension is supported in the support tube by means of brass sleeve journals formed with lubrication pockets. Thus once again the use of temperature-sensitive elastomeric materials is avoided. At the same time friction is largely avoided, in particular at the moment during reversal of angular displacement direction of the wheel-support lever.

According to this invention the inner arm of the wheel-support lever can be mounted at any of a plurality of angularly offset positions on the head at the outer end of the torsion bar. Adjustment means is provided for varying the angular position. Such an arrangement is particularly useful in a house trailer wherein uneven loading from side to side is likely, often in the neighborhood of 80 kg. In the system according to this invention if the one side is found to be too low, the bolts securing its wheel-support arm to the head of the torsion bar are loosened and the adjustment means is operated to bring the respective wheel down, until the entire trailer is leveled. Such an adjustment can be carried out even by a relatively inexperienced mechanic, and even on the road if necessary.

According to further features of this invention an antisway stabilizer bar is provided having one end seated in the inner end of the wheel-support arm of one wheel assembly and the opposite end fixed in the corresponding part of the opposite wheel assembly, with the stabilizer bar extending parallel to the wheel and bar axes and horizontally perpendicular to the normal direction of travel of the vehicle. This stabilizer bar can also be of polygonal, preferably hexagonal, section. It prevents swaying of the trailer from one side to the other during cornering, since any tendency of the outside wheel on the corner for being driven up in its wheel well will be countered by the corresponding and opposite tendency of the inside wheel to move down in its wheel well.

SPECIFIC DESCRIPTION

Figure 1:
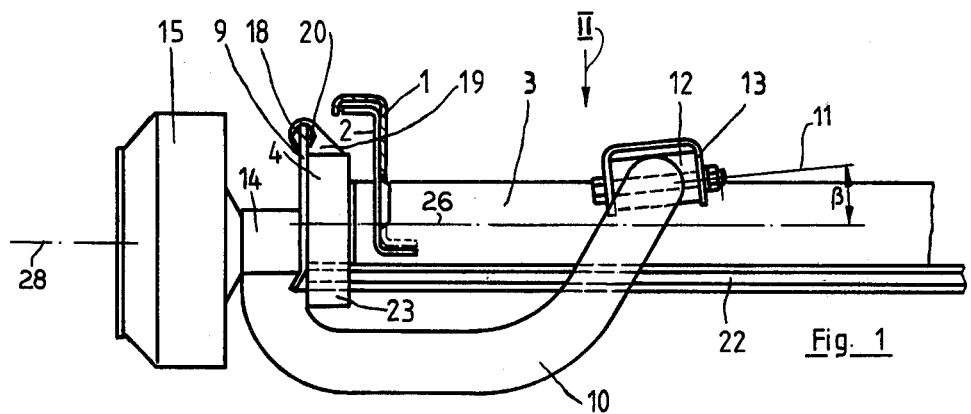
FIG. 1 is a rear view of the assembly according to this invention.

A vehicle, here a house trailer, has a main side beam 1 extending parallel to the normal horizontal direction of travel 16 of the vehicle. This beam 1 is provided adjacent each wheel with a mounting plate 2 to which is secured a fixed cylindrical support tube 3 centered on an axis 26 extending horizontally perpendicular to the direction 16. A mounting head 4 has a cylindrical tubular extension 27 extending into this tube 3 and journaled therein by means of brass sleeve bearings 5 spaced apart axially within the tube 3 and allowing the entire head 4 to rotate freely in the tube 3 about the axis 26. A torsion bar 6 here formed by three identical hexagonal-section steel rods has its outer end received in a complementarily shaped hole 7 in the head 4 and an inner end received in a fixed holder 17 spaced axially inwardly in the tube 3 from the head 4. A bolt 8 with a lock nut has a tip received in a recess of two of the rods forming the bar 6 to lock them axially on the head 4 to which they are locked rotationally at their outer ends by the good fit between these parts.

Figure 2:
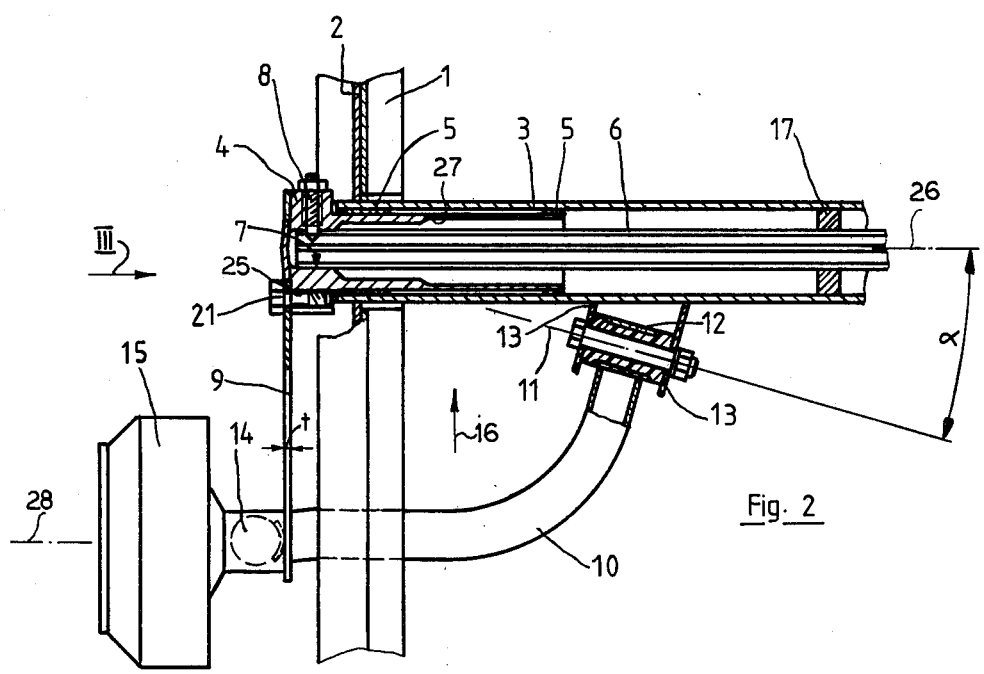
FIG. 2 is a partly sectional top view taken in the direction of arrow II of FIG. 1.
Figure 3:
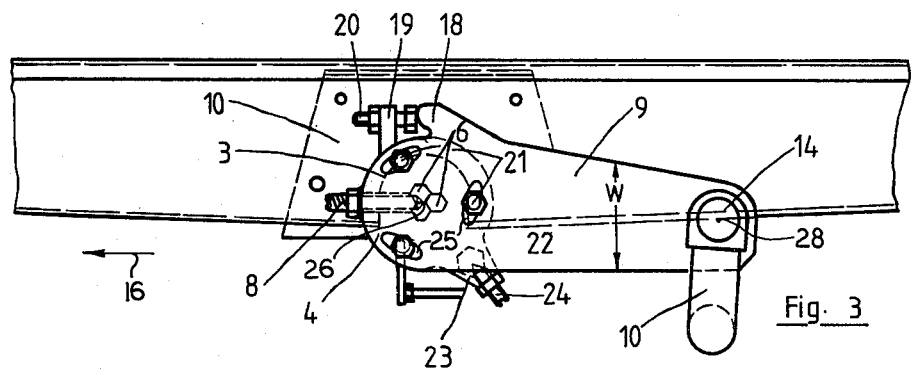
FIG. 3 is a side view taken in the direction of arrow III of FIG. 2, with some parts removed for clarity of view.

A sheet steel wheel-support arm 9 lying in a vertical plane parallel to the direction 16 has a thickness t equal to approximately 5 mm and a vertical width w equal to approximately b 80 mm. This arm 9 has an inner end formed centered on the axis 26 with three slots 25 through which bolts 21 engage, these bolts 21 being threaded into the head 4. This arm 9 is stiff in its plane, but is relatively flexible at its outer end, the lower end in FIG. 2, in a direction parallel to the axis 26. A rigid generally L-shaped wheel-support strut 10 has an inner end provided with a bearing 12 pivoted on a mount 13 fixed on the vehicle frame at the tube 3 for pivoting about an axis 11 which is skew to the axis 26, that is that neither intersects this axis nor is parallel thereto. Seen from above in FIG. 2 the axis 11 forms an angle $\alpha$ of 16° with the axis 26. Seen from behind as in FIG. 1 the axis 11 forms an angle $\beta$ with the axis 26 equal to 6°.

The outer end of the rigid strut 10 is joined to the outer end of the wheel-support arm 9 and carries a bearing 14 on which a wheel drum 15 is mounted for rotation about an axis 28 parallel to the axis 26. Extending downwardly from this bearing 14 is a short stub arm 10 to which the lower end of a shock absorber may be attached.

The angular position of the arm 9 on the head 4 can be adjusted by loosening the bolts 21 and by rotating an adjustment screw 20 that is threaded into a radial extension 19 of the head 4. This screw 20 can engage a projection or nose 18 of the inner end of the arm 9 to displace it angularly on the head 4 about the axis 26.

In addition the head 4 has a radial extension 23 in which an end of a transverse antisway or stabilizing bar 22 is secured, with a screw 24 substantially identical to the screw 8 serving to lock the end of this bar 22 in place. The other end of the bar 22, which extends parallel to the axes 26 and 28, is seated in a corresponding formation in the head of the opposite wheel-mount assembly.

With the system according to the instant invention as the wheel mounted on the drum 15 moves up and down as the vehicle having the frame 1 travels along the ground in direction 16, the rear axis 28 will itself pivot about the axis 11. During such pivoting the plate forming the arm 9 will be able to deform parallel to the axes 26 and 28, but will not be able to deform in its vertical plane extending in the transport direction 16.

The antisway bar 22 will counter the normal tendency of one wheel to move up in its well when the other wheel moves down in its well during cornering. Thus as the outside wheel in a curve tries to move up in its well, the inside wheel in the curve will try to move down in its well and will counter this effect.

If the vehicle does not sit level on the wheels mounted on the drums 15 when fully loaded, it is merely necessary to loosen the screws 21 slightly and then screw out or screw in the one bolt 20 until the vehicle is level, so that the screws 21 move slightly in the slots 25. Once the vehicle is level the screws 21 are again tightened. This operation can be carried out very easily on the road even with relatively simple tools.

The system according to the instant invention is very simple. It is almost entirely made of metallic parts, so that it is relatively unaffected by temperture. In addition due to its simple but robust construction it can be expected to have a long service life. Whatever goes wrong will be on the outside ends of the various parts and therefore relatively accessible and easy to rectify.

We claim:

1. An assembly for movably supporting a nondriven wheel on a frame of a trailer-type vehicle adapted to travel along the ground in a normal horizontal transport direction, said assembly comprising:

a torsion bar extending horizontally substantially perpendicular to said direction and having an inner bar end anchored to said frame and an outer bar end limitedly elastically pivotal about the bar axis relative to said inner bar end;

an arm extending generally perpendicular to said bar axis and generally in said direction and having an inner arm end fixed to said outer bar end and an outer arm end, said arm being substantially inflexible angularly of said bar axis between said arm ends so that same cannot move angularly relative to each other and being relatively flexible parallel to said bar axis between said arm ends so that same can move relative to each other parallel to said bar axis;

a substantially rigid and inflexible wheel-support strut having an outer strut end connected to said outer arm end and an inner strut end;

bearing means on said frame mounting said strut at said inner strut end for pivoting of said strut about a strut axis skew to said bar axis and passing through said inner strut end, whereby as said strut pivots about said strut axis said bar twists about said bar axis, said outer strut end moves parallel to said axis, and said arm deforms between said outer strut and bar ends with relative displacement parallel to said bar axis of said arm ends; and means at said outer strut and arm ends for mounting a wheel for rotation about a wheel axis substantially parallel to said bar axis.

2. The assembly defined in claim 1 wherein said arm is a flexible metal plate extending between said outer bar and outer strut ends and lying in a vertical plane generally perpendicular to said bar axis and generally parallel to said direction.

3. The assembly defined in claim 1 wherein said torsion bar includes a group of parallel rods lying against each other and having respective relatively elastically pivoted ends.

4. The assembly defined in claim 2 wherein said rods are of regular polygonal cross section whereby said rods can fit together in surface contact.

5. The assembly defined in claim 1 wherein said strut axis forms an angle seen from above with said bar axis of between 14° and 18° and seen from behind of between 4° and 8°.

6. The assembly defined in claim 1, further comprising means for securing said arm at said inner arm end in any of a plurality of angularly offset positions to said outer bar end.

7. The assembly defined in claim 1 wherein said frame includes a tube coaxially receiving said bar and provided with at least one journal adjacent said outer bar end rotatably supporting said bar.

8. The assembly defined in claim 1 wherein two such assemblies having coaxial bar axes are provided on said frame, said assembly further comprising a stabilizer torsion bar extending substantially parallel to said torsion bar and having outer ends anchored respectively in said arms between the arm ends thereof.

9. The assembly defined in claim 8 wherein said bars are provided at their said outer ends with radially projecting heads fixed to the respective outer ends and each having a radially projecting part in which the respective outer end of said stabilizer bar is fixed.

10. The assembly defined in claim 8 wherein said stabilizer bar is of regular polygonal section.

* * * * *